United States Patent [19]

Shiratsuchi

[11] 4,449,723
[45] May 22, 1984

[54] VEHICLE FUEL TANK

[75] Inventor: Kouji Shiratsuchi, Saitama, Japan

[73] Assignee: Honda Giken Kogyo Kabushiki Kaisha, Tokyo, Japan

[21] Appl. No.: 372,321

[22] Filed: Apr. 27, 1982

[30] Foreign Application Priority Data

Apr. 28, 1981 [JP] Japan .................................. 56-60630

[51] Int. Cl.³ .............................................. B60K 15/02
[52] U.S. Cl. .................... 280/5 H; 180/219; 180/225; 220/85.5; 280/5 A
[58] Field of Search ............... 180/219, 225; 280/5 R, 280/5 H, 5 A; 73/305, 317; 137/558; 220/85 S; 285/205

[56] References Cited

U.S. PATENT DOCUMENTS

| 3,116,402 | 12/1963 | Drugmand | 285/205 |
| 3,200,646 | 8/1965 | Donko et al. | 73/317 |
| 3,470,907 | 10/1969 | Smockey | 137/558 |
| 3,987,294 | 10/1976 | Carlson | 280/5 A |

FOREIGN PATENT DOCUMENTS 53-85423  7/1978  Japan .
56-44164  10/1981  Japan .

Primary Examiner—Joseph F. Peters, Jr.
Assistant Examiner—Kenneth R. Rice
Attorney, Agent, or Firm—Lyon & Lyon

[57] ABSTRACT

A vehicle fuel tank including a fuel level detector positioned within the fuel tank, the fuel level detector being connected to a base means which is positioned so as to fit in sealing relationship about a fuel level detector aperture formed within the vehicle fuel tank. The vehicle fuel tank is provided with a mounting bracket secured to the vehicle fuel tank about the fuel level detector aperture and means are provided for fastening the base means to the mounting bracket. Preferably, a sealing means is positioned between the base means and the fuel tank.

7 Claims, 10 Drawing Figures

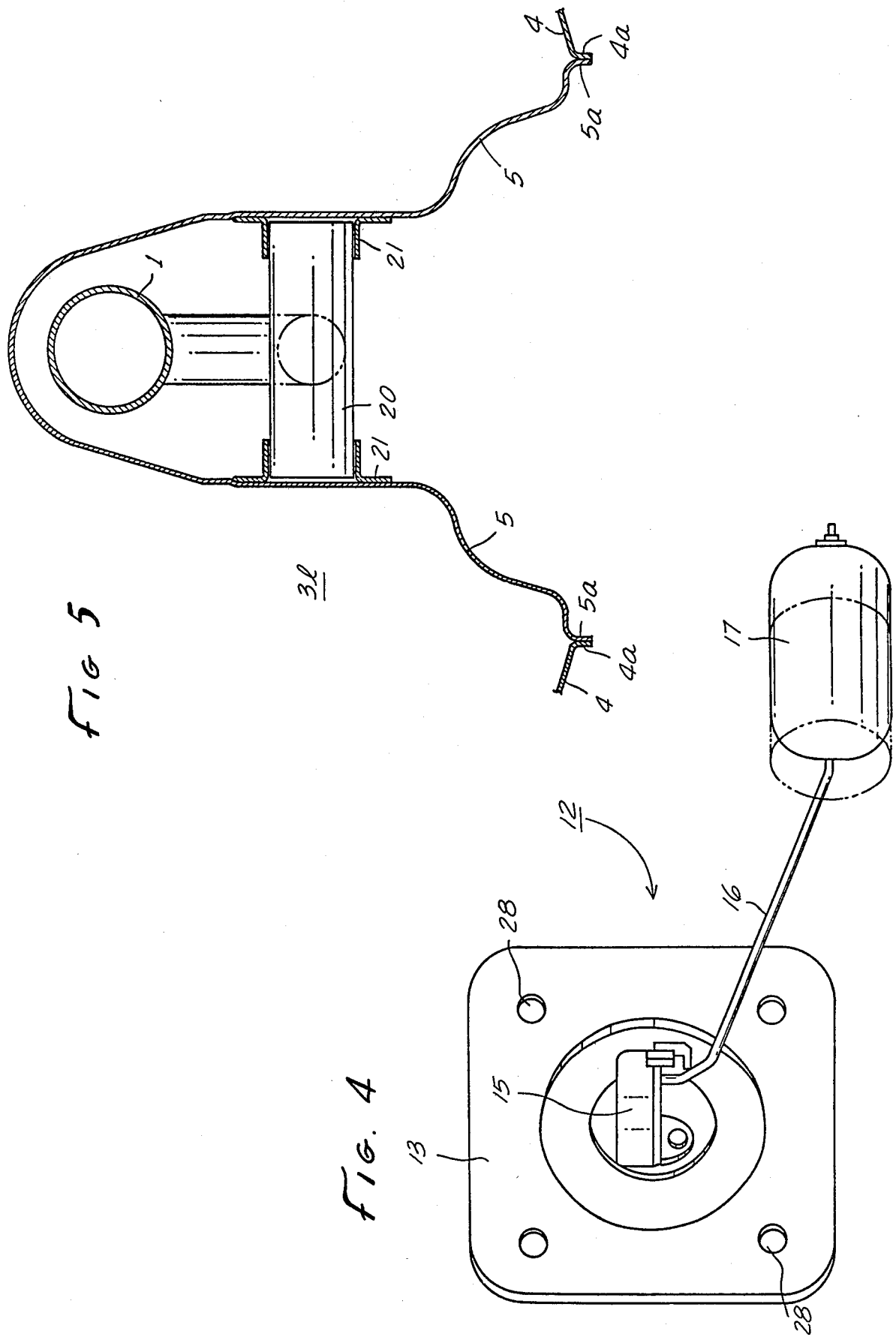

VEHICLE FUEL TANK

BACKGROUND OF THE INVENTION

The present invention is directed to a vehicle fuel tank having a fuel level detector positioned within the tank. In certain embodiments the vehicle fuel tank has a cross-sectional shape of an inverted "U" and is adapted to be mounted to straddle a main frame member, such main frame member including a bifurcated subframe branched therefrom.

SUMMARY OF THE INVENTION

This invention is directed to a vehicle fuel tank having a fuel level detector positioned within the tank. The fuel tank is provided with an aperture in order to allow the fuel level detector to be inserted within the tank. A mounting bracket is secured to the exterior of the fuel tank about the aperture for the fuel level detector. A base means connected to the fuel level detector is positioned so as to close the fuel tank aperture provided for the fuel level detector, and is secured to the mounting bracket by fastening means. In one embodiment both the fuel tank wall and the base means are provided with an annular recess adapted to receive a sealing means whereby the base means and the fuel tank cooperate to hold the sealing means in a sealing relationship.

BRIEF DESCRIPTION OF THE DRAWINGS

FIG. 4 is a view taken along Line IV of FIG. 3.

FIG. 5 is a cross-sectional view taken along Line V—V of FIG. 2.

DESCRIPTION OF THE PREFERRED EMBODIMENTS

Figure 1:
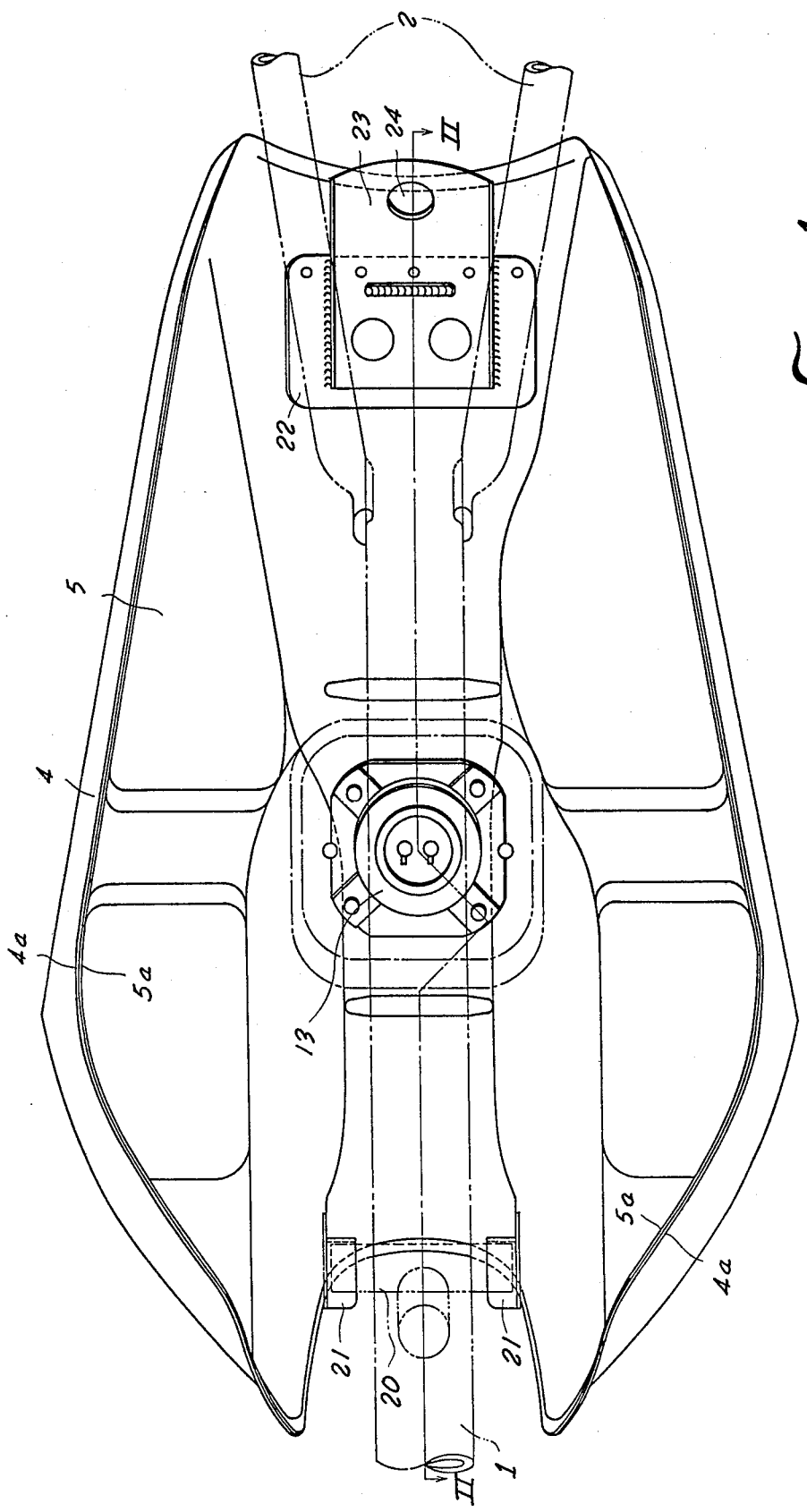
FIG. 1 is a bottom view illustrating one embodiment of the present invention.

Referring now to FIG. 1, a main frame 1, such as may be fabricated of a pipe or the like has a rear curve portion curved downward such that bifurcated sub-frames 2 are branched backward therefrom. A fuel tank 3, is shaped to straddle the main frame 1 and sub-frames 2 and may be constructed of an upper fuel tank section 4 and a lower fuel tank section 5, which when joined together form the vehicle fuel tank. As shown in the Figures, upper and lower fuel tank sections 4 and 5, respectively, form a vehicle fuel tank 3 having a cross-sectional shape of an inverted "U". The upper and lower fuel tank sections 4 and 5 have joint portions 4a and 5a curved generally in vertical directions in order to allow for their hermetical joining by means of seam welding or the like.

Figure 2:
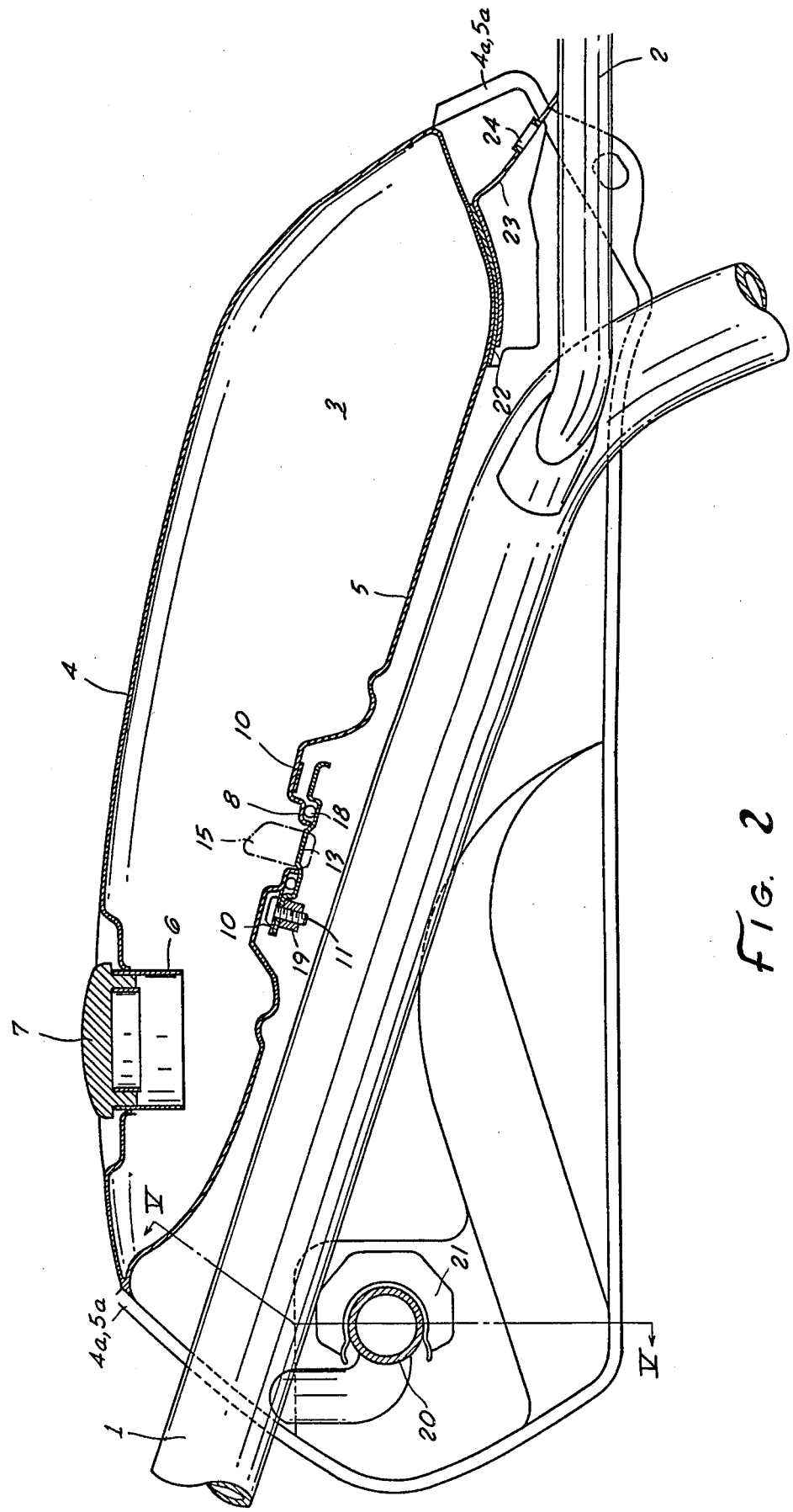
FIG. 2 is a longitudinal section taken along line II—II of FIG. 1.

FIG. 2 illustrates a fuel inlet 6 and a fuel tank cap 7. As shown in FIG. 2, the lower fuel tank section 5 may be provided with a double recessed portion 8 having two steps formed therein and having an aperture 9 for inserting a fuel level detector 12 therethrough. A mounting bracket 10 is integrally secured to the lower side 8a of the upper step of double recessed portion 8 as by means of spot welding or the like.

A threaded member 11 is inserted in advance, such threaded member extending through the mounting bracket 10 and likewise integrally secured to the mounting bracket 10 by a welding process or the like.

Base means 13 of the fuel level detector 12 is adapted to be mounted to the mounting bracket 10 and cover the aperture 9 which allows for the insertion of the fuel level detector 12. Base means 13 may also include a recess or step 14 in which a sealing means such as an O-ring 18 is positioned so as to engage portion 8a of a double recessed portion 8 of the lower fuel tank section 5. After the sealing means 18 has been sandwiched between the portion 8a and step 14, the base means is secured to the threaded member 11 and is hermetically, but attachably, mounted to the fuel tank 3.

Figure 3:
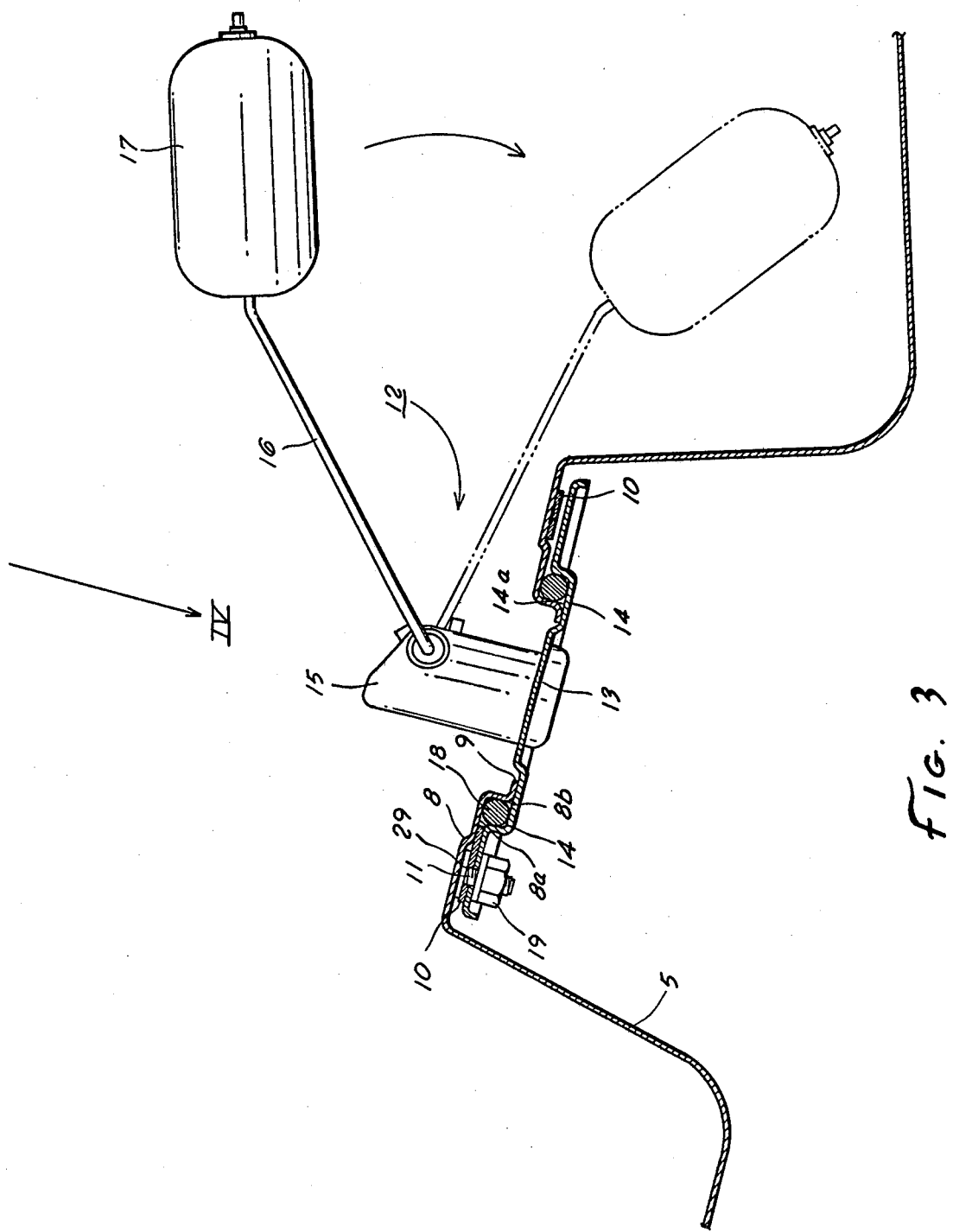
FIG. 3 is a longitudinally sectional side elevation.
Figure 6:
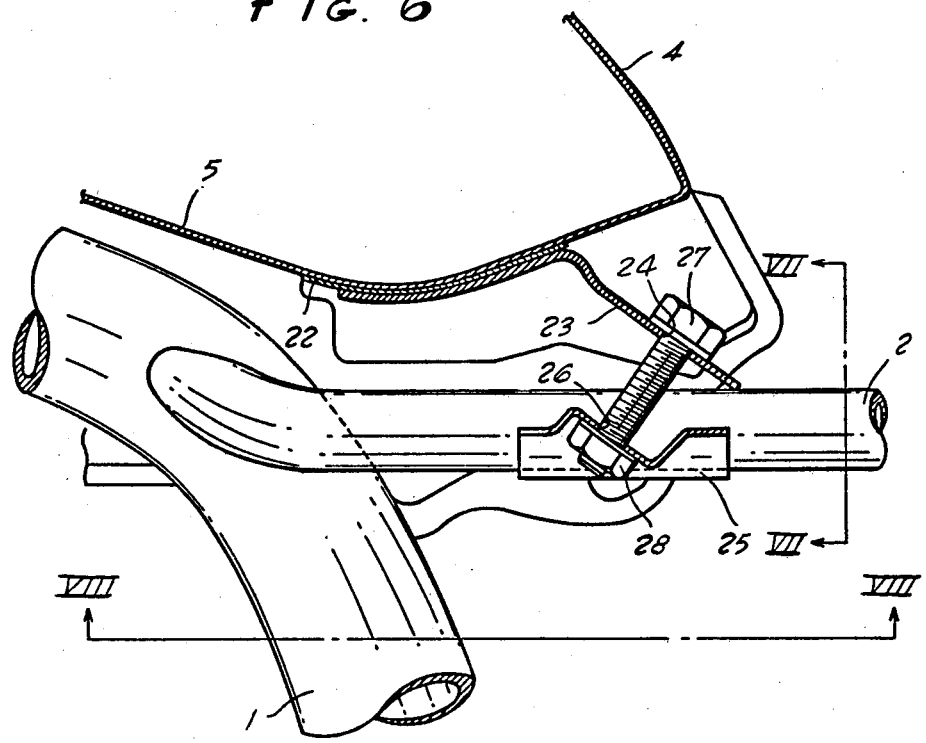
FIG. 6 is an enlarged longitudinally sectional side elevation of the rearward portion of FIG. 2.
Figure 7:
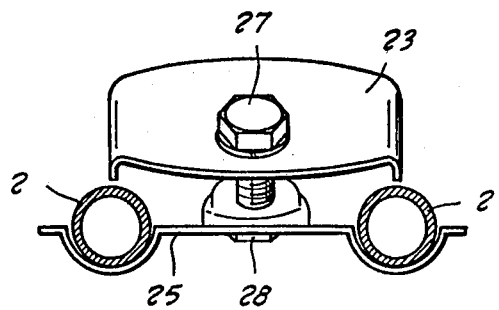
FIGS. 7 and 8 are views taken in the direction of Arrows VII—VII and VIII—VIII of FIG. 6.
Figure 8:
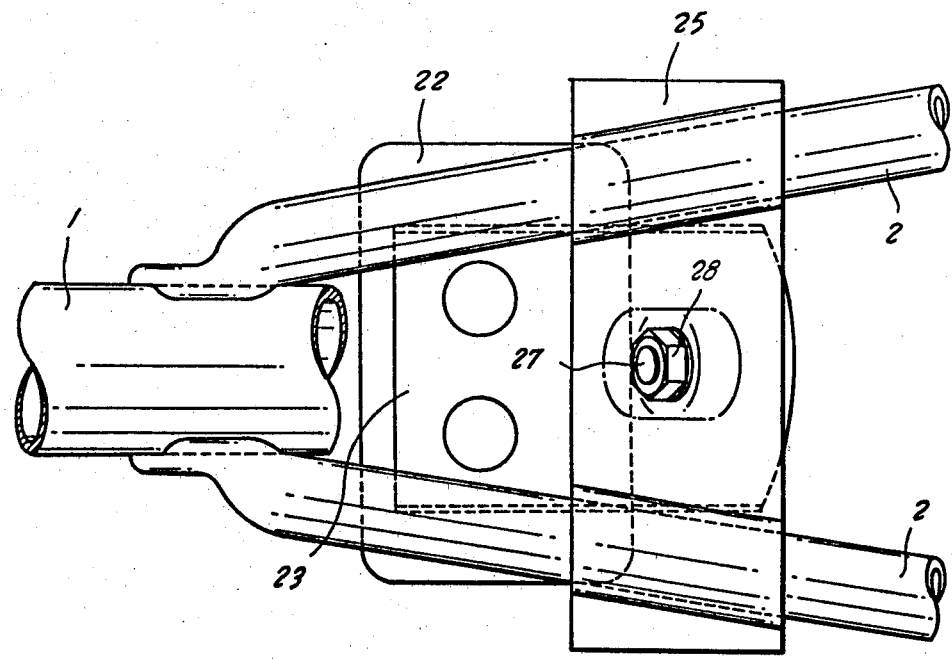
Figure 9:
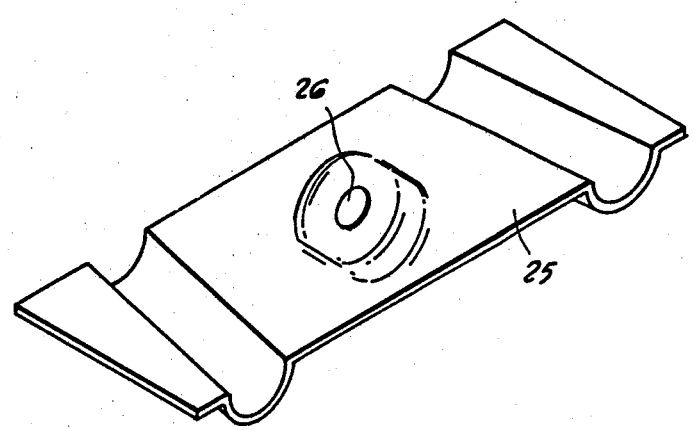
FIG. 9 is an enlarged perspective view illustrating a portion of FIG. 6.

Referring now to FIGS. 3 and 5, the fuel level detector 12 is shown to include a float hinge 15 to which a float 17 is so hinged through a lever 16 as to pivot vertically within the space 3l as shown in FIG. 5 such that the quantity of fuel remaining in the fuel tank 3 may be electrically detected in a manner to correspond to the angle of pivot.

FIG. 5 further illustrates brackets 21 fitted on each end of a supporting member 20 secured to the main frame 1, such brackets 21 being secured to the lower fuel tank section 5.

Referring now to FIGS. 6–9, a mounting base 22 is shown integrally fixed to the lower fuel tank section 5. Base 22 has affixed thereto, as by means of a welding process or the like, a bracket 23 having an aperture 24 positioned therein. Mounting plate 25 is integrally secured to the lower side of the two sub-frames 2 and a bolt means 27 may be inserted into the aperture 24 of the bracket 23 and the aperture 26 of the mounting plate 25 and may be fastened thereto by means of nut 28.

Figure 10:
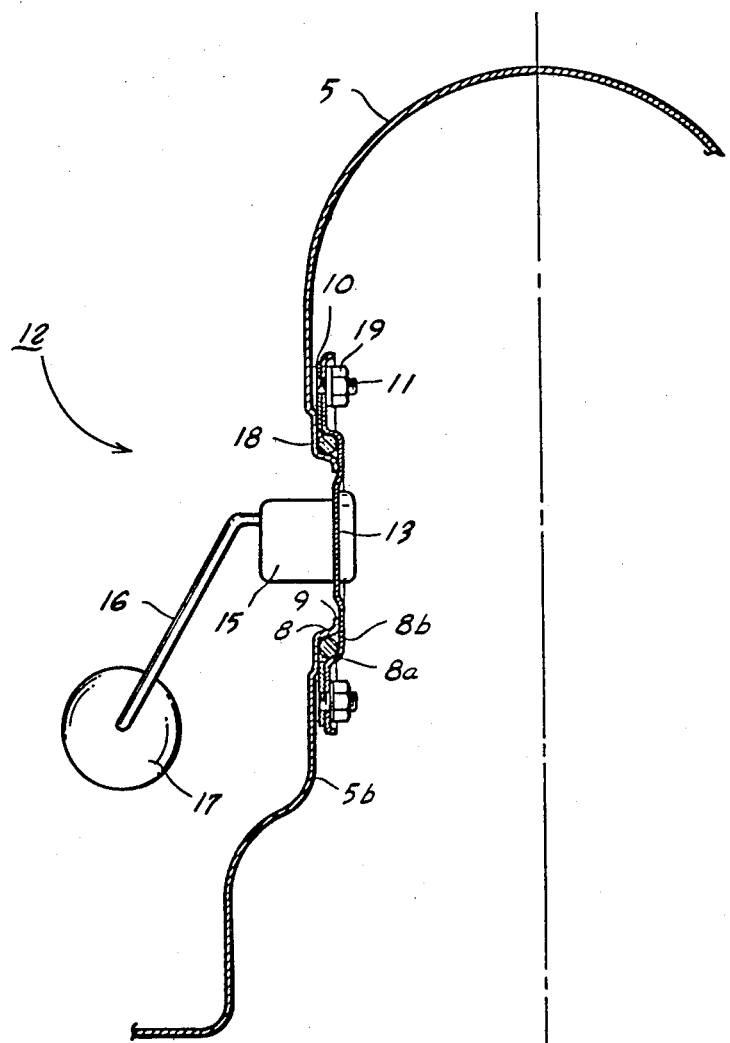
FIG. 10 is an enlarged cross-sectional front elevation view illustrating an embodiment of the present invention.

FIG. 10 illustrates an alternate location for the fuel level detector 12.

Accordingly, the present invention allows for the mounting of a fuel tank 3 to a main frame 1 and sub-frames 2. Such a fuel tank 3 includes a fuel level detector 12 mounted to a base means 13 which is in turn secured to a mounting bracket 10 by a fastening means such as a threaded member 11 and a nut 19.

What is claimed is:

1. A vehicle fuel tank comprising:
    upper and lower fuel tank sections which are joined together to form said fuel tank, said lower fuel tank section comprising an upper wall and a pair of side walls so as to form an inverted U-shaped portion for straddling a vehicle frame;
    a fuel inlet positioned within said upper fuel tank section;
    an aperture provided in said upper wall of said lower fuel tank section;
    a fuel level detector adapted to be inserted through said aperture into said fuel tank and mounted on said upper wall of said lower fuel tank section;
    a base means connected to said fuel level detector and positioned so as to close said aperture;
    means for fixedly mounting said base means on said lower fuel section; and
    sealing means positioned around said aperture and between said base means and said lower fuel tank section for being held under pressure therebetween.

2. The fuel tank claimed in claim 1 wherein said upper and lower fuel tank sections are initially separate and are joined together to form said fuel tank.

3. The fuel tank as claimed in claim 1 wherein said mounting means includes a mounting bracket secured to said lower fuel tank section about said aperture, and means for fastening said base means to said mounting bracket, said fastening means being adapted to allow said base means and said lower fuel tank section to cooperate in order to hold said sealing means in place.

4. The fuel tank claimed in claim 1 wherein said lower fuel tank section adjacent said aperture is provided with an annular recess within which said sealing means is positioned.

5. The fuel tank claimed in claim 4 wherein said base means is also provided with an annular recess adjacent said sealing means whereby said base means and said fuel tank cooperate to hold said seal means under pressure.

6. The vehicle fuel tank claimed in claim 1 wherein said fuel tank is adapted to be mounted so as to straddle the frame of the vehicle, said fuel tank further comprising means for securing said fuel tank to the frame.

7. The vehicle fuel tank claimed in claim 6 wherein the vehicle frame further includes bifurcated sub-frames branched therefrom and said fuel tank is further defined as comprising means for securing said fuel tank to said bifurcated sub-frames.

* * * * *